United States Patent Office 2,859,629
Patented Nov. 11, 1958

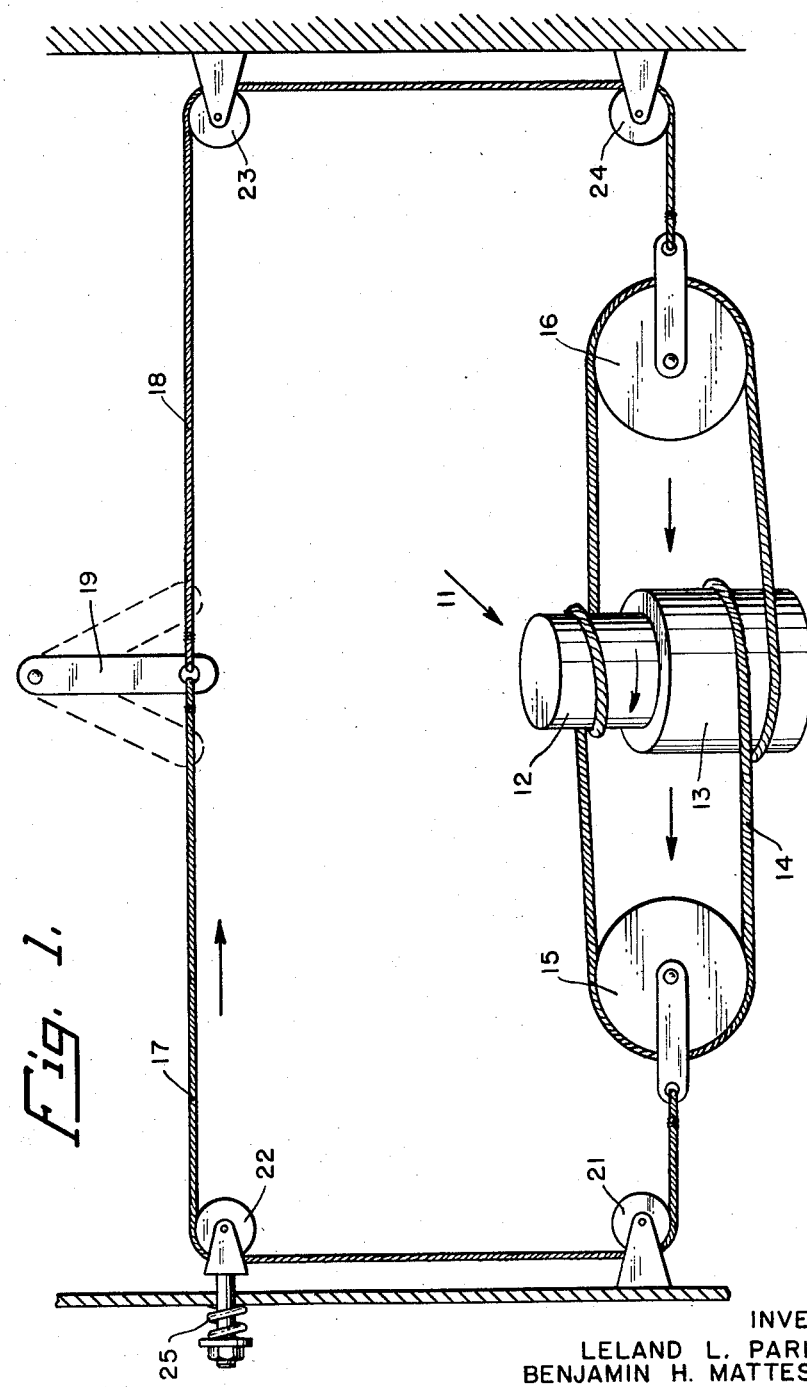

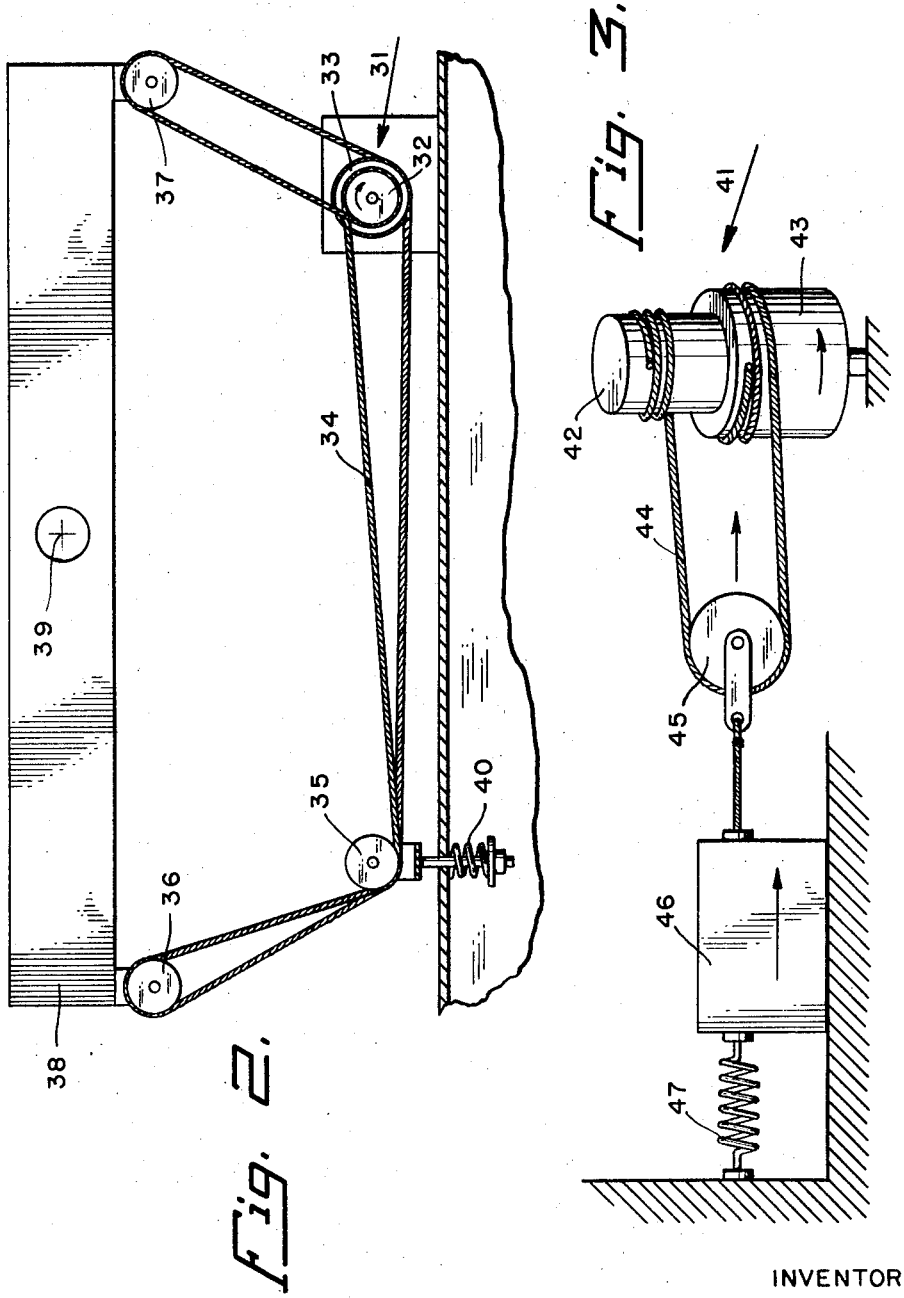

2,859,629

DIFFERENTIAL CABLE DRIVE MECHANISM

Leland L. Parker, Corona, Calif., and Benjamin H. Matteson, Jr., New Paltz, N. Y., assignors to the United States of America as represented by the Secretary of the Navy Application April 28, 1955, Serial No. 504,704

1 Claim. (Cl. 74—95)

(Granted under Title 35, U. S. Code (1952), sec. 266)

The invention described herein may be manufactured and used by or for the Government of the United States of America for governmental purposes without the payment of any royalties thereon or therefor.

This invention relates to a cable drive and more particularly to a differential cable drive mechanism wherein a large number of revolutions of the driving capstan are required to provide a limited angular or reciprocating linear movement of the driven member.

Many different driving mechanisms have been used for actuating aircraft control surfaces, radar antenna drives, and similar devices requiring a relatively large force for reciprocating linear movement or oscillation about a rotational axis. The prior mechanisms obtained motion and mechanical advantage by means of gears, hydraulically or with complicated systems of levers. Other mechanisms involving cable drives required substantial force and power on the driving mechanism to overcome the inertia and other resistant forces. The prior systems had many defects such as back-lash produced by wear or required by production tolerances, complicated designs resulting in costly production, or high inertia particularly where high strength is required.

The differential cable drive of the present invention consists essentially of a driving capstan having two drums of slightly different diameter, an endless cable which has one or more loops around one of the drums and extends in opposite directions around two sheaves and back around the other drum with one or more turns. The sheaves may be floating and connected to the moveable element by means of a second cable for producing limited rotational movement or reciprocation or the sheaves may be attached directly to the member which it is desired to oscillate or reciprocate. In either case a large number of turns of the capstan is required to produce a limited rotational movement of the oscillating member or linear movement since one complete revolution of the capstan will pay out slightly more cable in one direction than is taken up in the opposite direction with respect to one sheave to produce a very small relative movement of the sheave with respect to the capstan and therefore a very slight rotational movement of the oscillating member.

One object of the present invention is to provide a differential cable drive mechanism which obtains motion and a large mechanical advantage by a simple and economical system utilizing a differential driving capstan, sheaves and an endless cable.

Another object of the present invention is to provide a drive mechanism wherein the effects of backlash produced by wear or production tolerances is kept to a minimum.

A further object of the present invention is to provide a driving mechanism with low inertia and having a high mechanical advantage which provides large forces for operation of oscillating or reciprocating mechanisms.

Other objects and many of the attendant advantages of this invention will be readily appreciated as the same becomes better understood by reference to the following detailed description when considered in connection with the accompanying drawings wherein:

Fig. 1 is a simplified pictorial view illustrating one preferred embodiment of the present invention.

Fig. 2 is a schematic view illustrating one modification of the present invention, and Fig. 3 is a schematic view illustrating another modification of the present invention.

Referring now to the drawings in detail, the arrangement shown in Fig. 1 consists of a differential capstan 11 having a cylindrical portion or drum 12 of smaller diameter than the cylindrical portion or drum 13. An endless cable 14 has one or more turns taken around the smaller drum 12, is trained over the sheave 15, has one or more turns taken around the larger drum 13 and is trained over the other sheave 16, returning to the smaller drum 12. The sheaves 15 and 16 are connected to the ends of the cables 17 and 18, the opposite ends of each cable being attached to the oscillating member 19.

A plurality of pulleys 21, 22, 23 and 24 are provided and each is attached to a fixed portion of the device to guide the cables 17 and 18. One or more of the pulleys such as 22 shown in Fig. 1 may be resiliently mounted by spring 25 to maintain a tension on the cables 14, 17 and 18 thus eliminating the effect of backlash caused by stretching of the cables or wear in the parts of the mechanism.

A second form of the invention is illustrated in Fig. 2, wherein the differential capstan 31 is provided with a small diameter drum 32 and a larger diameter drum 33. An endless cable 34 is trained with one or more turns around the smaller drum 32 and in one direction extends over the idler pulleys 35 and 36 and returns to the larger drum 33 where one or more turns are taken and then extends over the idler pulley 37 and returns to the smaller drum 32.

The idler pulleys 36 and 37 in this modification are mounted directly on the oscillating member 38 to provide a limited rotation about the axis 39.

If desired the idler pulley 35 may be resiliently mounted as by the spring 40 which maintains a uniform tension on the cable 34 regardless of stretching or wear of the various parts of the mechanism to eliminate backlash as in the form of the invention shown in Fig. 1.

In either of these forms of the invention the differential capstan may be rotated in one direction a large number of revolutions to provide a limited rotation of the oscillating members 19 or 39 by taking in slightly more cable on the larger drum than is payed out on the smaller drum in one direction and paying out more of the cable on the larger drum and taking in less of the cable on the smaller drum in the opposite direction.

A still further form of the invention is shown in Fig. 3 wherein the differential capstan 41 is provided with a small diameter drum 42 and a large diameter drum 43. In this form of the invention the opposite ends of the cable 44 are secured to the drum 42 and the drum 43 respectively, and the cable extends over a sheave 45 which is adapted to reciprocate movable member 46 by rotation of the capstan in opposite directions. In this form of the invention a resilient member such as the spring 47 is provided to maintain a tension on the cable 44 and also to provide for movement of the member 46 in a direction away from the differential capstan. As in the other two modifications rotation of the capstan in one direction will pay out more cable from drum 43 than is reeled in on the drum 42 permitting the movable member 46 to be moved away from the capstan 41 by the spring 47 and in the direction of rotation shown in Fig. 3 the large drum 43 takes in more of the cable 44 than is payed out from the drum 42 to move the sheave 45 and movable member 46 toward the capstan. It will be apparent that by rotation of the capstan 41 in opposite directions the movable member 46 may be reciprocated as desired.

Obviously many modifications and variations of the present invention are possible in the light of the above teachings. It is therefore to be understood that within the scope of the appended claims the invention may be practiced otherwise than as specifically described.

What is claimed is:

A differential cable drive comprising an oscillating member, a differential capstan having two drums of two different diameters, a pair of sheaves positioned adjacent opposite sides of said capstan, an endless cable having a portion wrapped around the smaller drum and another portion wrapped around the larger drum and extending around each of said sheaves, a plurality of fixed pulleys and a resiliently mounted pulley, a first cable means connecting one of said sheaves and said oscillating member and passing through at least two of said fixed pulleys, and a second cable means connecting said other sheave and said oscillating member and passing through a third one of said fixed pulleys and said resiliently mounted pulley, whereby uniform tension is maintained on said first and second cable means to provide precisely controlled oscillation of said oscillating member in response to rotation of said capstan in opposite directions.

References Cited in the file of this patent

UNITED STATES PATENTS

| Number | Name | Date |
|---|---|---|
| 36,445 | Beckers | Sept. 16, 1862 |
| 222,406 | Johnson | Dec. 9, 1879 |
| 998,385 | Owen | July 18, 1911 |
| 1,040,423 | Russell | Oct. 8, 1912 |
| 1,155,181 | Wilkinson | Sept. 28, 1915 |
| 2,189,447 | Martin | Feb. 6, 1940 |
| 2,590,623 | Hulse | Mar. 25, 1952 |
| 2,694,315 | Swift | Nov. 16, 1954 |